United States Patent
Polese Cossio et al.

(10) Patent No.: US 10,841,487 B2
(45) Date of Patent: Nov. 17, 2020

(54) MOBILE COMPUTING DEVICE MOVEMENT GUIDANCE FOR SUCCESSFUL VISUAL CODE DETECTION WITHIN CAPTURED IMAGE

(71) Applicant: HEWLETT-PACKARD DEVELOPMENT COMPANY, L.P., Spring, TX (US)

(72) Inventors: Lucio Polese Cossio, Porto Alegre (BR); Diogo Sperb Schneider, Porto Alegre (BR); Leonardo Dias Marquezini, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/603,830

(22) PCT Filed: Nov. 1, 2017

(86) PCT No.: PCT/US2017/059520
§ 371 (c)(1),
(2) Date: Oct. 8, 2019

(87) PCT Pub. No.: WO2019/089022
PCT Pub. Date: May 9, 2019

(65) Prior Publication Data
US 2020/0280674 A1 Sep. 3, 2020

(51) Int. Cl.
H04N 5/232 (2006.01)
(52) U.S. Cl.
CPC ..... *H04N 5/23222* (2013.01); *H04N 5/23212* (2013.01); *H04N 5/23218* (2018.08)
(58) Field of Classification Search
CPC ........... H04N 5/23222; H04N 5/23212; H04N 5/23218; G06K 19/06168;
(Continued)

(56) References Cited

U.S. PATENT DOCUMENTS 7,296,747 B2 11/2007 Rohs
8,447,510 B2 5/2013 Fitzpatrick et al.
(Continued)

FOREIGN PATENT DOCUMENTS

WO WO2010147609 12/2009
WO WO2017095376 6/2017
WO WO2019005066 1/2019

OTHER PUBLICATIONS

"Measuring distance with a single photo", online h?p://www.ucl.ac.uk/news/newsAarBcles/0717/260717AMeasuringAdistanceAwithAaAsingleAphoto, Jul. 26, 2017, 4 pp.
Ethan Rublee, Vincent Rabaud, Kurt Konolige, Gary R. Bradski: ORB: An efficient alternative to SIFT or SURF. ICCV 2011.
http://www.pyimagesearch.com/2015/01/19/find-distance-camera-objectmarker-using-pythonopencv/.
https://developers.google.com/tango/overview/depth-perception, (Sep. 5, 2019).
(Continued)

*Primary Examiner* — Yogesh K Aggarwal
(74) *Attorney, Agent, or Firm* — Michael A Dryja

(57) ABSTRACT

Movement of a mobile computing device can be guided so that a current focal distance of a camera of the mobile computing device is within a focal distance range within which other mobile computing devices of a same model type captured images at a same location and in which the visual code was successfully detected. Movement of the mobile computing device can be guided so that a distance between prominent points within an image captured by the camera is within prominent points distance range calculated from a distance between the prominent points within each image captured by the other mobile computing devices. An exposure of the camera can be adjusted to be within a range of exposures at which the other mobile computing devices captured the images.

15 Claims, 6 Drawing Sheets

(58) Field of Classification Search
CPC ........... G05B 2219/04538; G05B 2219/37137; G11B 20/0026; G03H 2210/53
USPC ................ 348/335, 340, 345, 348, 350, 352
See application file for complete search history.

(56) References Cited

U.S. PATENT DOCUMENTS

| | | |
|---|---|---|
| 9,218,455 B2 | 12/2015 | Neff |
| 9,324,003 B2 | 4/2016 | France et al. |
| 9,558,553 B2 | 1/2017 | Nuggehalli et al. |
| 2008/0031610 A1 | 2/2008 | Border et al. |
| 2013/0217410 A1 | 8/2013 | Ku et al. |
| 2016/0227181 A1 | 8/2016 | Ilic et al. |
| 2016/0371633 A1 | 12/2016 | Stout et al. |
| 2017/0064214 A1* | 3/2017 | Zhang ................ G06K 9/00912 |
| 2018/0152629 A1* | 5/2018 | Ekpenyong ............. G06T 3/403 |

OTHER PUBLICATIONS https://get.google.com/tango/, (Sep. 5, 2019).
https://play.google.com/store/apps/details?id=kr.sira.measure, (Sep. 5, 2019).
https://www.digimarc.com/application/consumer-packaged-goods, (Sep. 5, 2019).
Scanning barcodes with the NeoReader™ application, May 11, 2017, http://support.sonymobile.com/gb/xperiae/userguide/scanning-barcodes-with-the-neoreader-application/.
Tekin, E. et al., S-k Smartphone Barcode Reader for the Blind, Jun. 2014, < https://www.ncbi.nlm.nih.gov/pmc/articles/PMC4288446/>.

* cited by examiner

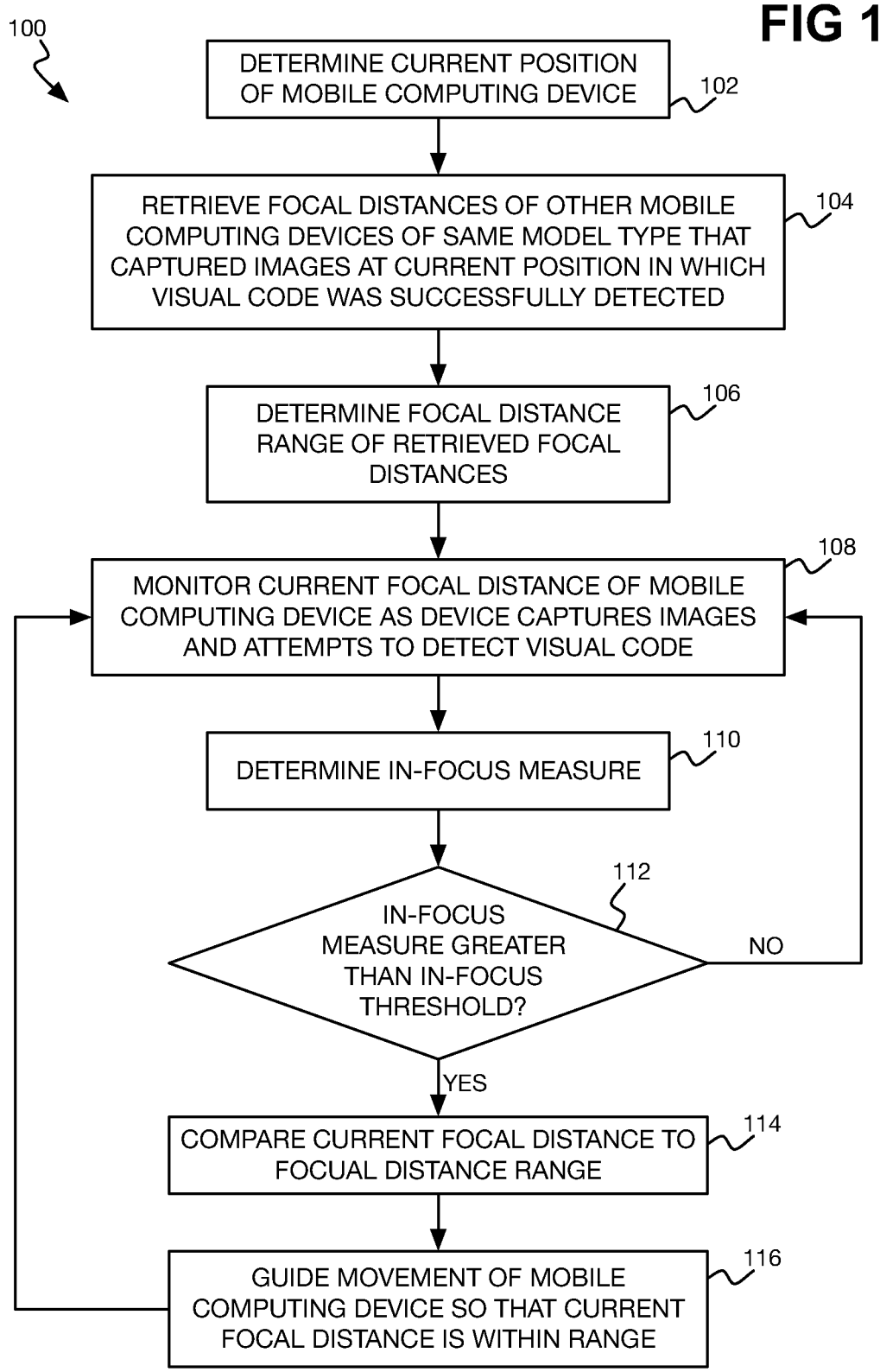

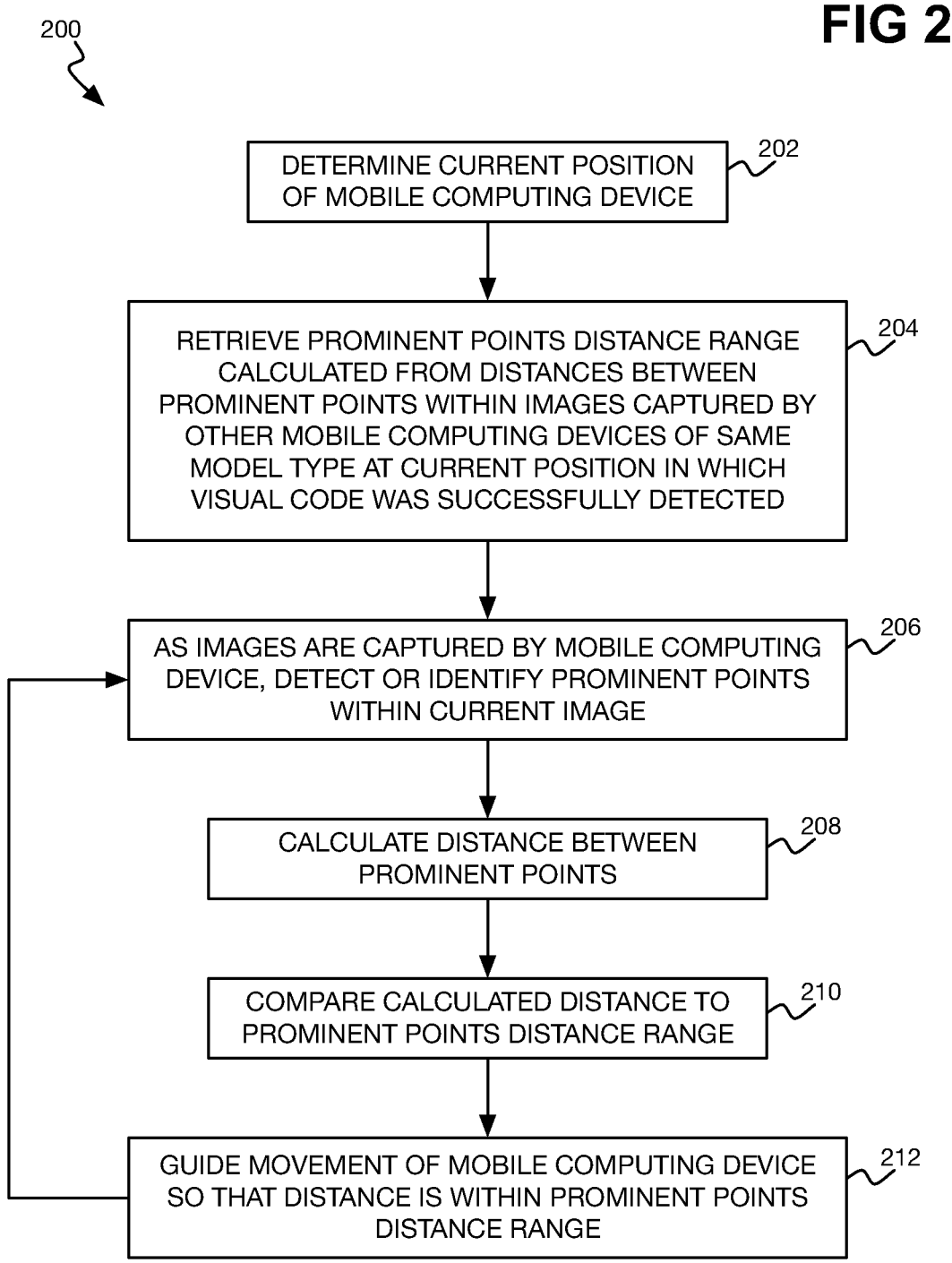

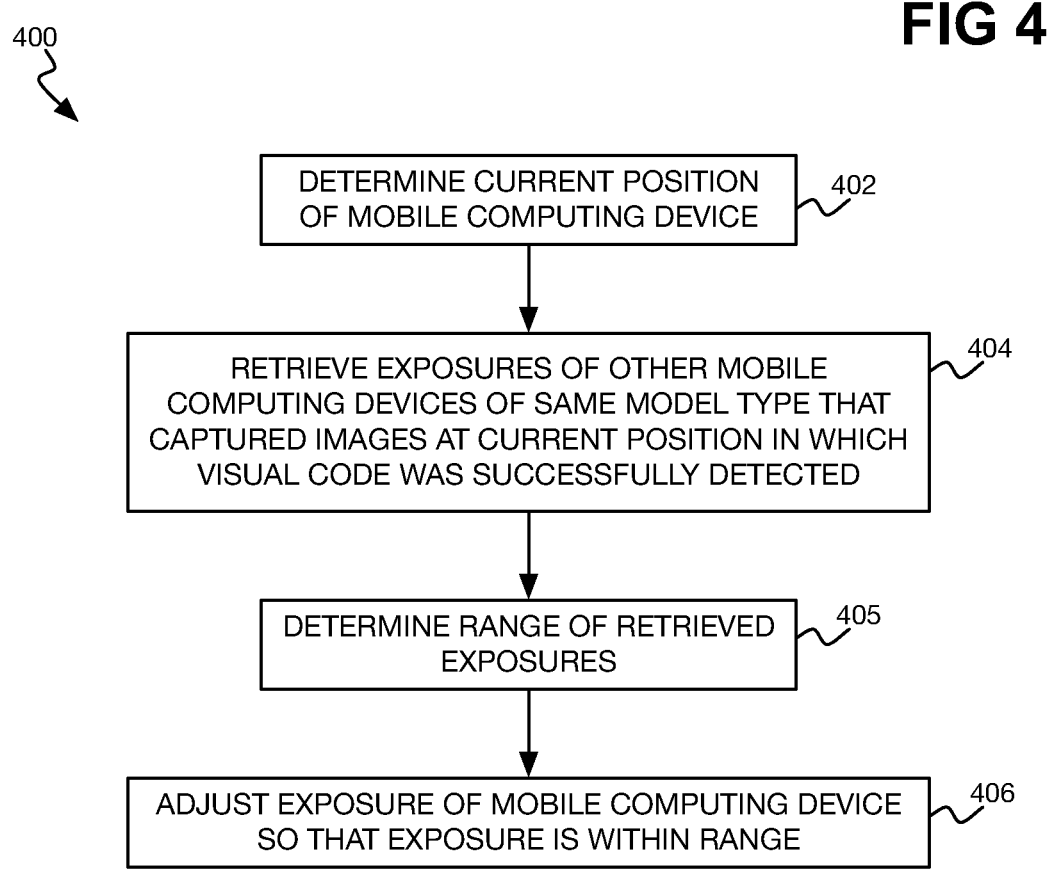

US 10,841,487 B2

MOBILE COMPUTING DEVICE MOVEMENT GUIDANCE FOR SUCCESSFUL VISUAL CODE DETECTION WITHIN CAPTURED IMAGE

BACKGROUND

Digital watermarks and other visual codes are visual marks that can be added to or embedded into images that are printed on physical media like paper, cardboard, and labels, which can then be affixed at stationary locations. For example, the media can include signage advertising goods or services and affixed to walls of airports, bus stations, and other public locations. The media can include signage or tags for products that are affixed to or are part of the packaging of the products or the products themselves, or that are affixed to shelving where the products are located and that list information regarding the products.

A visual code may or may not be visible or perceptible to the naked eye, but even if visible or perceptible, is not intuitively understandable to a human viewer. A visual code can be a one- or two-dimensional barcode that is perceptible to the naked eye, but which contains information that is not understandable by a human viewer. A visual code that is not visible or perceptible to the naked eye includes codes that are created by imperceptibly changing low-level aspects of the image in a way that a human viewer will not be able to perceive.

BRIEF DESCRIPTION OF THE DRAWINGS

FIG. 1 is a flowchart of an example method for guiding movement of a mobile computing device for successful detection of a visual code within an image captured by the device, using focal distance.

FIG. 2 is a flowchart of an example method for guiding movement of a mobile computing device for successful detection of a visual code within an image captured by the device, using prominent points distance.

FIG. 4 is a flowchart of an example method for improving successful detection of a visual code within an image captured by a mobile computing device, by adjusting the exposure of the device when capturing images.

DETAILED DESCRIPTION

Figure 3A:
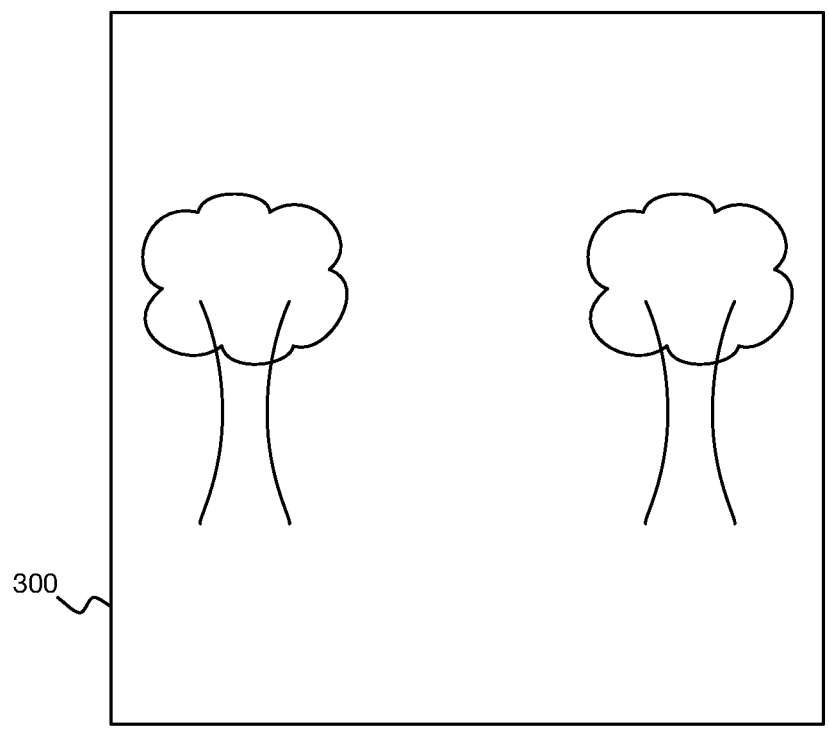
FIGS. 3A and 3B are diagrams of example images of the same prominent points captured closer to and farther away, respectively, from the prominent points.

As noted in the background section, digital watermarks and other visual codes are visual marks added to or embedded into images that are printed on physical media that can be affixed at stationary locations. Users can employ mobile computing devices that include digital image-capturing hardware, such as smartphones that include digital cameras, to capture images of the physical media on which the visual code-containing images have been printed. Image processing can then be performed on the captured images at the mobile computing devices, or at another computing device like a server to which the mobile computing devices have uploaded their captured images, to detect the visual codes within the captured images.

Once a visual code has been identified within an image captured by a mobile computing device, a corresponding action can be performed based on the information contained in the visual code. As an example, a user may be viewing an advertisement printed on a sign affixed to the wall of an airport, and that includes a visual code. The user may be interested in learning more about the product or service that is the subject of the advertisement. Therefore, the user can capture an image of the advertisement via his or her smartphone. The smartphone can perform image processing to detect and decode the visual code, which may provide a universal resource locator (URL) address of a web site regarding the product or service. The smartphone can then automatically browse to the web site for the user to peruse.

Similarly, a user may be in a retail store and interested in potentially purchasing a particular type of product. A tag affixed to shelf that lists rudimentary information regarding a product, such as its name and price, may include a visual code. To learn more about the product, the user can capture an image of the tag using his or her smartphone. Imaging processing detects and decodes the visual code within the image, which may similarly provide a URL address of a web site regarding the product that the user can visit using his or her smartphone, or which may result in adding the product to a virtual shopping cart for subsequent easier checkout by the user.

The detection and decoding of visual codes within captured images of physical media can also cause the performance of concrete physical actions. For example, information technology (IT) personnel may be responsible for configuring computing devices like servers. Rather than manually selecting from a number of different computing configurations via a graphical user interface (GUI) displayed on a smartphone to configure a server communicatively connected to the smartphone, the user may capture an image of a physical medium including a visual code corresponding to the selected configuration. The smartphone can then configure the server according to the detected visual code within the captured image.

Similarly, a factory or shop worker may be able to control factory or shop equipment and thus customize the production of products via capturing images of physical media including visual codes. Robotic equipment may physically transform materials like steel, plastic, and so on, in different ways. A worker may capture an image of a physical medium including a visual code corresponding to a particular way by which the robotic equipment is to physically transform a material, resulting in the equipment physically transforming the material according to the selected way of the detected visual code within the captured image. As another example, a worker may capture an image of a physical medium including a visual code corresponding to how printing devices are to print images on media (e.g., in black-and-white versus in color; on cardstock versus on paper; and so on). Once the visual code is detected within the captured image, the printing devices are correspondingly controlled to print images on media according to the information contained within the decoded visual code.

These techniques for utilizing a visual code printed on a physical medium hinge on the ability to detect and decode the visual code within a captured image of the physical medium. If the visual code cannot be detected within a captured image, then no action corresponding to the information contained with visual code can be performed. Techniques described herein assist a user in guiding movement of a mobile computing device, like a smartphone, to promote successful visual code detection within an image captured by the mobile computing device.

For instance, other users may have used mobile computing devices of the same model type of mobile computing device as the user and at the same location as the user to capture images in which visual codes were successfully detected. The focal distances of the images captured by these mobile computing devices in which the visual codes were successfully detected can be used to guide the user in moving his or her mobile computing device so that the device can capture an image in which a visual code is successfully detected. Specifically, the mobile computing device can guide the user to move the device closer to or farther away from a current focal plane so that the current focal distance of the device lies within the range of focal distances of the prior captured images at the same location in which visual codes were successfully detected, until the device successfully detects a visual code within an image captured by the device.

This technique may thus presume that the user is pointing his or her mobile computing device towards a visual code, but that the device is not properly focusing on the code, such that the mobile computing device is unable to detect the visual code within its captured images. This technique therefore leverages the focal distances at which the mobile computing devices of other users and of the same model type were able to successfully detect an image at the same location. This information is used to assist the user in moving his or her mobile computing device relative to the presumed visual code so that a focused image of the visual code can be captured, which permits the visual code to be successfully detected within this image.

In another example, other users may have used mobile computing devices of the same model type as the user's mobile computing device and at the same location of the user to capture images in which visual codes were successfully detected. The images may include common identifiable prominent points. For instance, a visual code at the location may be part of an advertisement having particular features of which prominent points can be discerned within captured images of the visual code. A logo of the advertiser, for example, may have particular corners that are identifiable within the captured images. As another code, a static landmark, such as a traffic sign, may be present by a visual code at a particular location, and may have particular features of which prominent points can be discerned within captured images of the visual code.

The distance between the prominent points within these images can be used to guide the user in moving his or her mobile computing device so that the device can capture an image in which a visual code is successfully detected. Specifically, as the user's mobile computing device captures images, the distance between the same prominent points within these images is calculated. The mobile computing device thus can guide the user to move the device closer to or farther away from a current focal plane so that this calculated distance is within the range of prominent points distances within prior captured images at the same location in which visual codes were successfully detected, until the user's device successfully detects a visual code within a captured image.

Both these techniques may presume that the user is maintaining his or her mobile computing device at an orientation in which the device is pointed towards a visual code, but that the mobile computing device is unable to successfully detect the visual code within the images that it is capturing. In the former technique, the user is guided to move the mobile computing device away from or closer to him or herself, while maintaining the device at its current orientation, until the focal distance of the images that the device captures is within a focal distance range of prior captured images in which visual codes were successfully captured. In the latter technique, the user is guided to move the computing device away from or closer to him or herself, again while maintaining the device at its current orientation, until the calculated prominent points distance within the images that the device captures is within a prominent points distance range of prior captured images in which visual codes were successfully captured.

As a third example, other users may have again used mobile computing devices of the same model type of mobile computing device as the user and at the same location as the user to capture images in which visual codes were successfully detected. The exposures of the images can be used to increase the likelihood that the user's mobile computing device will capture an image in which a visual code can be successfully detected. Specifically, the settings of the user's mobile computing device can be adjusted so that the exposures of the images that the device captures is within the range of exposures of the prior captured images in which visual codes were successfully detected at the user's location. If this proves to not be possible, then the user may be guided to change aspects of the environment in which he or she is located. For instance, the user may be attempting to capture an image of a visual code in a low-light environment whereas prior images of others in which visual codes were successfully captured were in a much brighter environment. Therefore, the user may be requested to turn on a light, or otherwise increase the brightness of the user's current environment.

FIG. 1 shows an example method 100 for guiding movement of a mobile computing device so that the device captures an image in which a visual code is successfully detected, using the mobile computing device's focal distance. The mobile computing device can be a smartphone having a digital camera or other image-capturing hardware. The method 100 can be implemented as program code stored on a non-transitory computer-readable data storage medium and that is executed by the mobile computing device. Performance of the method 100 may assume that a user is attempting to capture an image of a visual code using the mobile computing device, so that the mobile computing device ultimately successfully detects the visual code within the image.

The mobile computing device determines its current position (102). The position of the device can include its location, as well as its orientation. The location of the mobile computing device can be determined via global positioning system (GPS) hardware of the device, or in another manner, such as via a Wi-Fi positioning system for indoor settings in which GPS hardware is less likely to provide an accurate position. The orientation of the mobile computing device can include its pitch, direction, and so on, and may be determined using accelerometer hardware of the device, or in another manner, such as via tilt sensor hardware of the device.

The mobile computing device can retrieve focal distances of other mobile computing devices of the same model type that captured images at the same position in which a visual code was successfully detected (104). When a given mobile computing device successfully detects a visual code within a captured image, the device may report the code that it detected to a central server or other location. Along with the code, such a mobile computing device may also report other information, including the model type of device, the device's current position (including location and/or orientation), and the device's focal distance. Therefore, in part 104, the mobile computing device performing the method 100 can subsequently retrieve this information.

In the method 100, focal distance may be considered as an approximate relative proxy to distance to an object on which the camera of the mobile computing device has focused. Focal distance may be considered an approximate relative proxy to object distance because there may not be a direct linear relationship between focal distance and object distance. Some types of mobile computing devices, such as smartphones, can provide their current focal distance responsive to calling an application programming interface (API) of an operating system running on the devices. The focal distance that a mobile computing device returns when it has focused on an object at a particular distance away from the device, however, can differ based on the model type of the mobile computing device. That is, a mobile computing device made by one manufacturer may return a different focal distance than a mobile computing device made by a different manufacturer, even when both devices have successfully focused on the same object at the same distance away. Indeed, mobile computing devices of different model types made by the same (or different) manufacturer may return different focal distances when successfully focused on the same object at the same distance away. As such, in part 104, the mobile computing device just retrieves focal distances of mobile computing devices of the same model type.

The mobile computing device determines a focal distance range from the retrieved focal distances (106). In one scenario, there may just be one visual code at the mobile computing device's current location. For instance, just one visual code may have been successfully detected in the images previously captured by other mobile computing devices at the same location. In this case, the minimum focal distance of any mobile computing device of the same model type that captured an image at the same location in which the visual code was successfully detected can be set as the lower bound of the focal distance range. The maximum focal distance of any mobile computing device of the same model type that captured an image at the same location in which the visual code was successfully detected can be set as the upper bound of the focal distance range. More generally, statistical techniques can be used to determine the focal distance range, from the retrieved focal distances.

In another scenario, there may be more than one visual code at the mobile computing device's current location. For instance, one visual code may have been successfully detected in some images previously captured by other mobile computing devices at the same location, and a different visual code may have been successfully detected in other images previously captured by still other mobile computing devices at the same location. In this case, for each different visual code, a focal distance range is determined from the retrieved focal distances, such as by using the technique described in the previous paragraph, and which are referred to as focal distance sub-ranges herein. The focal distance range as a whole can then be determined by overlapping the focal distance sub-ranges for the visual codes.

For example, the smallest lower bound of the focal distance sub-ranges may be set as the lower bound of the focal distance range, and the greatest upper bound of the sub-ranges may be set as the upper bound of the range. As another example, the common focal distance range within the focal distance sub-ranges may be determined. For instance, if the focal distance sub-range for a first visual code is between A and C, and the focal distance sub-range for a second visual code is between B and D, where A is less than B, B is less than C, and C is less than D, then the common focal distance range is between B and C. This is because the focal distance range between B and C is common to the focal distance sub-range for each visual code.

The mobile computing device monitors its focal distance (108), as the camera of the device captures images, and as the device attempts to detect a visual code within a captured image. The mobile computing device may also determine an in-focus measure (108). The in-focus measure indicates whether or not the camera of the mobile computing device has successfully focused on any object. That is, the in-focus measure indicates whether images that the mobile computing device is currently capturing are in-focus or not (i.e., blurry). In one implementation, the in-focus measure may be determined as a variance of a Laplacian kernel over a gray scale version of the currently captured image. If the in-focus measure is not greater than an in-focus threshold corresponding to the image being in focus and not blurry (102), then the method 100 proceeds back to part 108.

However, if the in-focus measure is greater than this threshold (112), such that the image that the mobile computing device currently captured is in focus and not blurry, then the mobile computing device compares the current focal distance of the device to the focal distance range determined in part 106 (114), and guides the user to move the device so that the current focal distance is within this range (116). The method 100 can then proceed back to part 108. The method 100 may terminate when the mobile computing device has successfully detected a visual code within a captured image, or if the user stops the ongoing image capture and visual code detection process without a visual code being successfully detected. That is, while parts 108, 110, 112, 114, and 116 of the method 100 are being performed, the mobile computing device may be continually capturing images and attempting to detect a visual code within the current image. The guidance provided in part 116 thus aids the user in positioning the mobile computing device relative to the visual code so that the device can successfully detect the visual code that is of interest to the user.

As an example of movement guidance in part 116, the current focal distance of the mobile computing device determined in part 108 may be A. If the focal distance range is determined as between B and C in part 106, where A is less than B and B is less than C, then the mobile computing device requests that the user move the device away from the object that the user is currently attempting to focus the device on (which is presumably the visual code). Since focal distance is being leveraged as an approximate relative proxy for object distance, and since other mobile computing devices of the same model type successfully detected a visual code at the current position at focal lengths greater than the current focal length of the mobile computing device performing the method 100, the user may be positioning the device too close to the visual code. Therefore, the mobile computing device may more likely successfully detect the visual code in a captured image if the device is farther away from the visual code than it currently is.

As another example, the current focal distance of the mobile computing device may be D. If the focal distance range is between B and C as before, where B is less than C, and C is less than D, then the mobile computing device requests that the user move the device towards the object that the user is currently attempting to focus the device on (which again is presumably the visual code). Similar to the previous paragraph, since focal distance is being leveraged as an approximate relative proxy for object distance, and since other mobile computing devices of the same model type successfully detected a visual code at the current position at focal lengths less than the current focal length of the mobile computing device performing the method 100, the user may be positioning the device too far away from the visual code. Therefore, the mobile computing device may more likely successfully detect the visual code in a captured image if the device is closer to the visual code than it currently is.

The movement guidance provided in part 116 may be in the form of a spoken voice, an auditory and/or visual signal, and/or in another form. The guidance can specify that the user maintain the current orientation of the mobile computing device, on the assumption that the user is successfully pointing the device towards a visual code of interest. The guidance thus may just request that the user move the mobile computing device towards or away from the visual code of interest, while keeping the device aimed at the visual code.

FIG. 2 shows an example method 200 for guiding movement of a mobile computing device so that the device captures an image in which a visual code is successfully detected, using the distance between prominent points within images captured by the device. Like the method 100, the method 200 can be implemented as program code stored on a non-transitory computer-readable data storage medium and that is executed by the mobile computing device. Performance of the method 200 also may assume that a user is attempting to capture an image of a visual code using the mobile computing device, so that the mobile computing device ultimately successfully detects the visual code within the image.

The mobile computing device determines its current position (202), as in part 102 of the method 100. The mobile computing device can retrieve a prominent points distances range that is calculated from distances between prominent points within images captured by other mobile computing devices of the same model type at the same position in which a visual code was successfully detected (204). When a given mobile computing device successfully detects a visual code within a captured image, the device may report the code that it detected to a central server or other location. Along with the code, such a mobile computing device may also report other information, including its current position (including location and/or orientation), and the captured image in which a visual code was successfully detected.

The central server may process each such received image for prominent points. The prominent points of an image are a small set of points, at least two in number, which can be identified using an image-processing technique. For instance, a visual code may be displayed within a black triangle on a white sign, such that prominent points within an image of the sign may include the three corners of the triangle. In another implementation, a feature extraction algorithm may be applied against an image, and for each of a small number of most readily identified features, a prominent point defined as a center point of the feature.

The captured images can include the same prominent points, since the same visual code may have been successfully detected within each image. The distance between at least a pair of the identified prominent points, such as each unique pair of such points, can be calculated. One or more prominent points distance ranges are then calculated from these distances. Just for explanatory purposes, the remainder of the detailed description is described with respect to one prominent distance range, calculated from the distance between one pair of prominent points of each image. In general, however, there can be more than one prominent points distance range, corresponding to multiple different pairs of prominent points.

As such, the same prominent points are identified in each image captured by each mobile computing device in which a given visual code was successfully detected. The distance between the prominent points in the image captured by each mobile device thus correspond to one another. The maximum prominent points distance within a captured image in which the visual code was detected can be the upper bound of the prominent points distance range, and the minimum prominent points distance within a captured image in which the visual code was detected can be the lower bound of this range. More generally, statistical techniques can be used to determine the prominent points distance range, from the prominent points distances.

The distance between the prominent points serves as an approximate relative proxy representing how far away a mobile computing device was from a visual code when the device captured an image in which the visual code was successfully captured. The prominent points distance range thus can indicate the range of distances as to how far away the mobile computing devices were from the visual code when they captured images in which the visual code was successfully captured. This range can then be used by the mobile computing device performing the method 200 to assist the user with moving the device so that the visual code can be successfully captured within an image captured by the device.

For example, two images may include the same prominent points, such as two of the three corners of a triangle. However, one image may have been taken farther away than the other image. In the former image, the two triangle corners in question will be located closer to each other than in the latter image. Within images of the same relative or normalized size, in other words, the prominent points within the image captured when a mobile computing device was physically closer to the prominent points will be farther away than within the image captured when the device was physically farther away from these points.

Figure 3B:
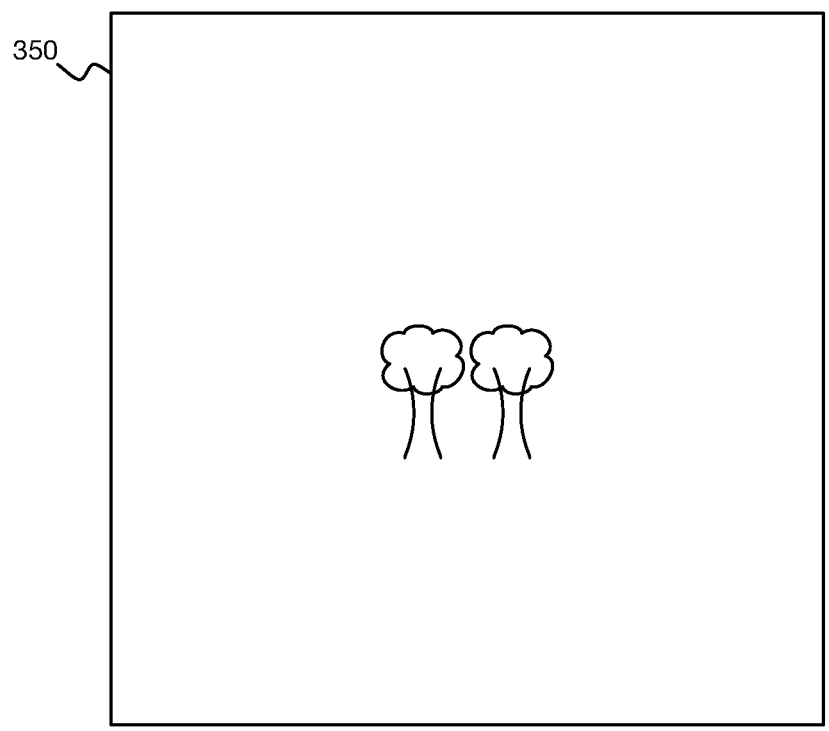

FIGS. 3A and 3B show example images 300 and 350, which illustrate how prominent points are farther from one another as images are captured closer towards the points. The images 300 and 350 are of a pair of trees. The images 300 and 350 themselves are of the same size. However, when capturing the image 300 using a mobile computing device, the user was closer to the trees than when the user captured the image 350. The trees in the image 300 are thus larger in size than they are in the image 350, but are farther apart than they are in the image 350. As such, if each tree includes a prominent point, the prominent points are closer together in the farther-captured image 350 than they are in the nearer-captured image 300.

Referring back to FIG. 2, as images are captured by the mobile computing device performing the method 200, and as the device attempts to detect a visual code within a captured image, the device also detects or identifies the prominent points within each image (206). In the specific implementation depicted in FIG. 2, the prominent points are first identified within the images captured by the cameras of other mobile computing devices at the location of the mobile computing device performing the method 200, and in which a visual code was identified. Then, the mobile computing device performing the method 200 detects the same prominent points within the images that it captures. In another implementation, the order is reversed: the mobile computing device performing the method 200 first identifies prominent points within the images that it captures. The mobile computing device 200 then notifies the central server of these prominent points, and the server processes the images previously captured by other mobile computing devices at the same location (and in which a visual code was successfully captured) to detect the same prominent points within these images.

The former implementation permits pre-processing of the images captured by the other mobile computing devices to identify the prominent points. That is, these images can be processed as the central server receives them from the mobile computing devices. However, there may be a risk that the mobile computing device performing the method 200 is unable to detect the same prominent points within its captured images. The latter implementation, by comparison, uses the prominent points that the mobile computing device can identify in its captured images. However, in this implementation, the central server then has to quickly process what may be a large number of images captured by the other mobile computing devices to detect the same prominent points in those images.

It is noted that there can be more than one visual code at the location of the mobile computing device performing the method 200. In this case, the prominent points in captured images in which one visual code was successfully detected may be different than those in captured images in which another visual code was detected. Therefore, the prominent points used in the method 200 are those that can be identified within the images captured by the mobile computing device performing the method 200.

For example, a first visual code may have been successfully detected in captured images by other mobile computing devices, where such images include prominent points P1 and P2. A second visual code may have been successfully detected in other captured images that include prominent points P3 and P4. If prominent points P1 and P2 are being detected in the images captured by the mobile computing device performing the method 200, then just the distances between prominent points P1 and P2 are considered, and the distances between prominent points P3 and P4 are not considered. If prominent points P3 and P4 are being detected in the images captured by the mobile computing device performing the method 200, then just the distances between prominent points P3 and P4 are considered, and the distances between prominent points P1 and P2 are not considered.

In another case, the prominent points in captured images in which one visual code was successfully detected may be the same as those in captured images in which another visual code was successfully detected. In this situation, a sub-range of the distance of prominent points may be determined for the images in which each visual code was successfully detected. The sub-ranges can be merged together into a range of prominent points distances.

For example, prominent points P1 and P2 may be identified in captured images in which a first visual code was successfully detected, and the same prominent points P1 and P2 may be identified in other captured images in which a second visual code was successfully detected. The (sub-)range of distances between the prominent points in images in which the first visual code was successfully detected may be between A and C, and the (sub-)range of distances between the prominent points in images in which the second visual code was successfully detected may be between B and D. If A is less than B, B is less than C, and C is less than D, then the range of distances between the prominent points can be determined as between A and D. This is because A is the lower bound of the two sub-ranges, and D is the upper bound of the two sub-ranges.

The mobile computing device performing the method 200 calculates the distance between the prominent points that the device identified or detected (208), and compares this calculated distance to the retrieved prominent points distance range (210). The mobile computing device then guides the user to move the device so that the calculated distance is within this range (i.e., in subsequent images that the device captures) (212). The method 200 can proceed back to part 206. The method 200 may terminate when the mobile computing device has successfully detected a visual code within a captured image, or if the user stops the ongoing image capture and visual code detection process without a visual code being successfully detected. That is, while parts 206, 210, and 212 of the method 200 are being performed, the mobile computing device may be continually capturing images and attempting to detect a visual code within the current image. The guidance provided in part 212 thus aids the user in positioning the mobile computing device relative to the visual code so that the device can successfully detect the visual code that is of interest to the user.

As an example of movement guidance in part 212, the distance between prominent points calculated in part 208 may be A, and the prominent points distance range in part 204 may be between B and C, where C is greater than B. If A is greater than C, then this means that the mobile computing device performing the method 200 is closer to the visual code of interest to the user than the other mobile computing devices were when they captured images in which the code was successfully detected. Therefore, the mobile computing device requests the user to move the device away from the visual code. By comparison, if A is less than B, then this means that the mobile computing device is farther away from the visual code than the other mobile computing devices were when they captured images in which the code was successfully detected. Therefore, the mobile computing device requests the user to move the device closer to the visual code. As in the method 100, the movement guidance provided in part 212 may be in the form of a spoken voice, an auditory and/or visual signal, and/or in another form.

FIG. 4 shows an example method 400 for improving successful detection of a visual code within an image captured by a mobile computing device, by adjusting the exposure of the device when capturing images. Like the methods 100 and 200, the method 400 can be implemented as program code stored on a non-transitory computer-readable data storage medium and that is executed by the mobile computing device. Performance of the method 200 can assume that a user is attempting to capture an image of a visual code using the mobile computing device, so that the mobile computing device ultimately successfully detects the visual code within the image.

The mobile computing device determines its current position (402), as in part 102 of the method 100. The mobile computing device can retrieve the exposure of other mobile computing devices of the same model type that captured images at the same position, in which a visual code was successfully detected (404). As noted above, when a given mobile computing device successfully detects a visual code within a captured image, the device may report the code it detected to a central server. The mobile computing device may also report other information, including its current position, and the values of various settings and measurements at which the device captured the image, including exposure.

The exposure of a mobile computing device when capturing an image can be amount of light per unit area that reaches the device's camera during image capture. The exposure thus can be increased by increasing the illumination of the surrounding environment at the time of image capture. The exposure can further be increased by increasing the size of the aperture of the mobile computing device's camera, and by decreasing the speed of the shutter of the camera.

The mobile computing device can determine a range of the retrieved exposures (405). The minimum exposure at which any mobile computing device of the same model type captured an image at the same location in which a visual code was detected can be set as the lower bound of this range. The maximum exposure at which any mobile computing device of the same model type captured an image at the same location in which a visual code was detected can be set at this upper bound of the range. More generally, statistical techniques can be used to determine the exposure range, from the retrieved exposures.

The mobile computing device can then adjust its exposure so that the exposure is within the range of exposures (406), to increase the likelihood that an image will be captured in which a visual code can be detected. That is, that other mobile computing devices of the same type were able to detect a visual code in images captured at the same location at a certain range of exposures means that the mobile computing device performing the method 400 may be more likely to detect a visual code in a captured image if its exposure is within this range. The mobile computing device may adjust the exposure by using (or not using) its built-in flash to increase illumination, by adjusting the size of the aperture during image capture, and by adjusting shutter speed during image capture. If the lower bound of the range of exposures is higher than the mobile computing device can achieve by adjusting these settings, then the device may instruct the user to provide external illumination, such as by turning on a light, and so on. Similarly, if the upper bound of the range of exposures is lower than the mobile computing device can achieve by adjusting its setting, then the device may instruct the user to decrease external illumination, such as by turning off a light.

The methods 100, 200, and 400 that have been described thus increase the likelihood that a mobile computing device will detect a visual code within a captured image. In the methods 100 and 200, the user of the mobile computing device is guided to move the device relative to the visual code that the user is presumably attempting to have the device detect, while maintaining the physical orientation of the device. In the method 400, the mobile computing device attempts to adjust settings itself before requesting assistance from the user.

The methods 100, 200, and 400 may be specific to mobile computing device model type. That is, the focal distance at which mobile computing devices capture images in which visual codes at a particular location are successfully detected may vary by model type. The distance between prominent points distance may also be affected by the model type of the mobile computing device that captured an image including the pair of prominent points in question. Similarly, the exposure at which the mobile computing devices capture images in which the visual codes are successfully detected may vary by model type. Therefore, a mobile computing device performing the method 100, 200, or 400 retrieves relevant information concerning just mobile computing devices of the same model type.

Figure 5:
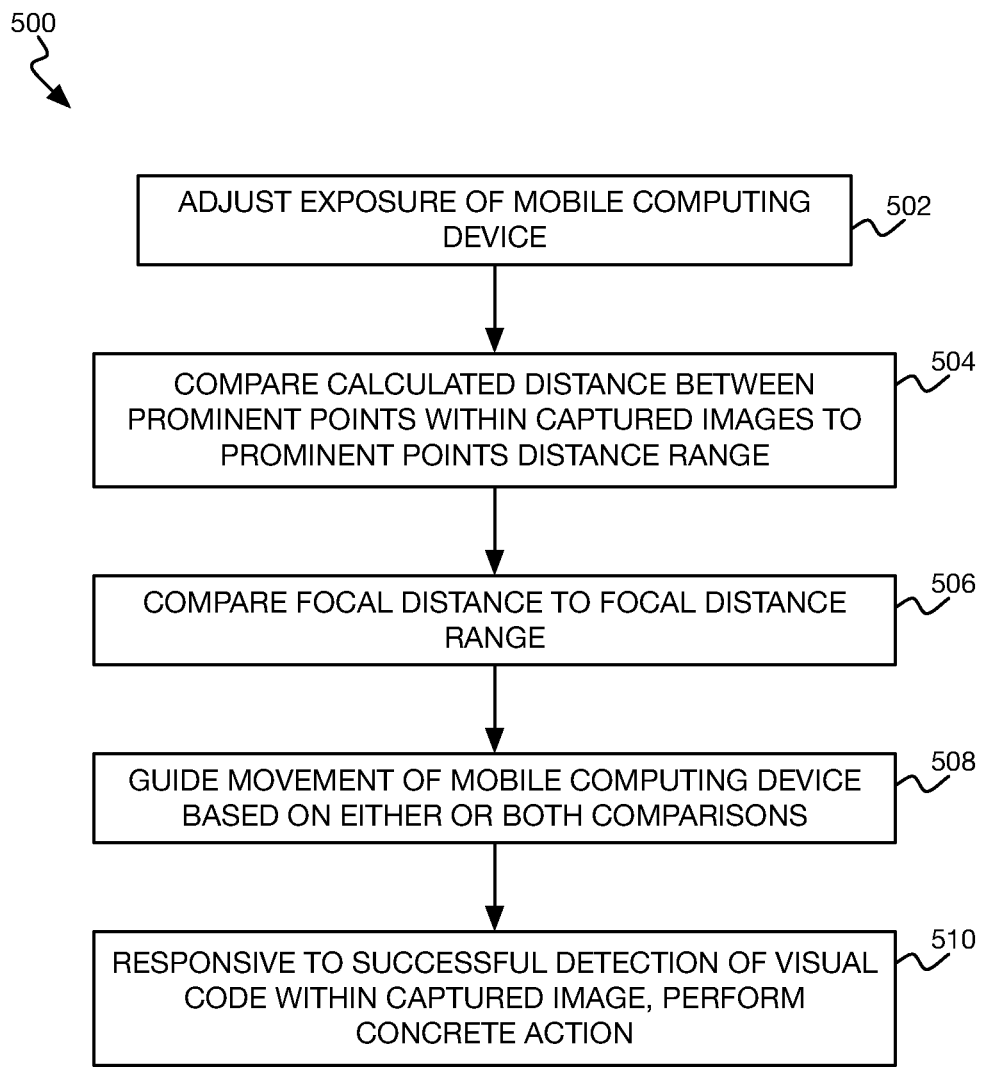
FIG. 5 is a flowchart of an example method for improving successful detection of a visual code within an image captured by a mobile computing device, which integrates the approaches of FIGS. 1, 2, and 4.

FIG. 5 shows an example method 500 for improving successful detection of a visual code within an image captured by a mobile computing device. The method 500 integrates the approaches that have been described in relation to the methods 100, 200, and 400. As with these methods, the method 500 can be implemented as program code stored on a non-transitory computer-readable data storage medium and that is executed by the mobile computing device. The method 500 can assume that a user is attempting to capture an image of a visual code using the mobile computing device, so that the mobile computing device ultimately successfully detects the visual code within the image.

The mobile computing device can adjust its exposure (502), as has been described in relation to the method 400. As the mobile computing device is capturing images and attempting to detect a visual code within the images, the device can compare a calculated distance between prominent points within the images to a prominent points distance range (504), as has been described in relation to the method 200. Also as the mobile computing device is capturing images and attempting to detect a visual code within the images, the device can compare its focal distance to a focal distance range (506), as has been described in relation to the method 100.

The mobile computing device can then guide movement of the device, based on either or both comparison (508). For instance, the mobile computing device may guide movement just if both the comparisons yield consistent conclusions as to the direction in which to move the device. As such, if the prominent points distance comparison indicates that the mobile computing device should move closer to the visual code of interest to the user, but the focal distance comparison indicates that the device should move farther away from the visual code (or vice-versa), then no movement guidance is provided to the user.

In another implementation, however, the mobile computing device still guides movement even if the two comparisons yield contradictory conclusions as to the direction in which to move the device. That is, the prominent points distance comparison may indicate that the mobile computing device should be moved in one direction, and focal distance comparison may indicate that the device should be moved in the opposite direction. In this case, the mobile computing device guides movement in one of the two directions, depending on which comparison is based on underlying information of lesser variability, which can, for instance, be expressed by a statistical variance measure.

Specifically, the prominent points distance comparison is based on the distance between the prominent points identified in each of a number of images captured by other mobile computing devices in which a visual code was successfully detected, and there is variability among these distances. That is, the distance between the identified prominent points in an image captured by one mobile computing device is unlikely to be identical to the corresponding distance in an image captured by every other device. The focal distance comparison is based on the focal distance of each of these mobile computing devices when capturing an image in which the visual code was successfully detected, and similarly there is variability among these distances. The focal distance at which one mobile computing device captured an image is unlikely to be identical to the focal distance at which every other device captured an image.

In this implementation, if the prominent points distance has lower variability, then the mobile computing device performing the method 500 guides movement in the direction indicated by the prominent points distance comparison. This is the case even if the direction indicated by the prominent points distance comparison is opposite that indicated by the focal distance comparison. Similarly, if the focal distance has lower variability, then the mobile computing device guides movement in the direction indicated by the focal distance comparison, even if this distance is opposite that indicated by the prominent points distance comparison.

As with the methods 100 and 200, the mobile computing device performing the method 500 continually guides movement of the device as the device captures images, until the mobile computing device successfully detects a visual code within a captured image or the user stops the ongoing image capture and visual code detection process without a visual code being successfully detected. Assuming that a visual code is successfully detected within a captured image, however, then an action, such as a concrete action, can be performed (510), examples of which have been described at the beginning of the detailed description. The method 500 thus leverages the approaches of the methods 100, 200, and 300 in improving the likelihood that such a visual code will be successfully detected within a captured image.

Figure 6:
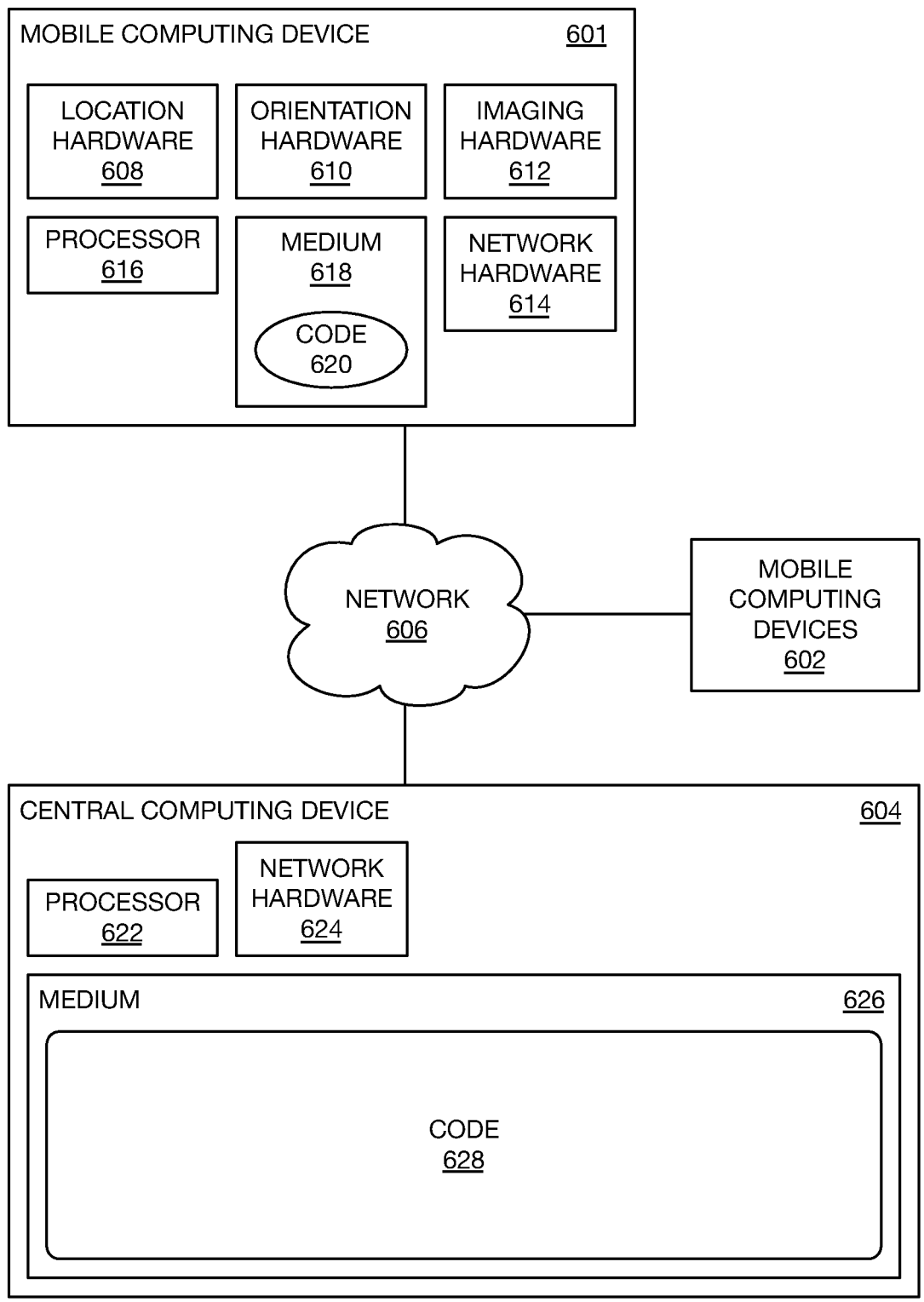
FIG. 6 is a diagram of an example system, in relation to which the methods of FIGS. 1, 2, 4, and 5 can be performed.

FIG. 6 shows an example system 600 in relation to which the methods 100, 200, 400, and 500 can be performed. The system 600 includes a mobile computing device 601, one or more other mobile computing devices 602, and a central computing device 604, all of which are communicatively connected via a network 606. The mobile computing device 601 may be a smartphone, for instance, as can the mobile computing devices 602. The mobile computing device 601 is depicted in detail in FIG. 6, but the mobile computing devices 602 can be implemented in a similar manner. The central computing device 604 can be a server. The network 606 can be or include the Internet, intranets, extranets, local-area networks (LANs), wide-area networks (WANs), wired networks, wireless networks, mobile telephony data networks, and so on.

The mobile computing device 601 can include location hardware 608, orientation hardware 610, imaging hardware 612, which is also referred to as a camera, network hardware 614, a processor 616, and a non-transitory computer-readable data storage medium 618. The location hardware 608 determines the location of the device 601, and can include GPS hardware. The orientation hardware 610 determines the orientation of the device 601, and can include accelerometer hardware, tilt sensor hardware, magnetometer, and so on. The imaging hardware 612 permits the device 601 to capture an image, and may be a digital camera or digital video-recording hardware. The network hardware 614 communicatively connects the device 601 to the network 606, and may be wireless network hardware such as Wi-Fi network hardware, mobile telephone data network hardware, and so on. In the case where the network hardware 614 includes Wi-Fi network hardware, the location hardware 608 can be coextensive with the network hardware 614 to determine the location of the device 601 via a Wi-Fi positioning system. The processor 616 executes program code stored 620 on the medium 618, to perform at least some parts of the methods that have been described.

The central computing device 604 can include a processor 622, network hardware 624, and a non-transitory computer-readable medium 626. The network hardware 624 communicatively connects to the device 604 to the network 606, and may be wired network hardware such as Ethernet network hardware. The processor 622 can execute program code 628 stored on the medium 626. For instance, the central computing device 602 may receive information from mobile computing devices like the device 602 when they successfully detected visual codes within captured images, as has been described, on which basis other information may then be provided to a mobile computing device like the device 601 when it is attempting to detect a visual code within a captured image.

The techniques that have been described herein thus improve the likelihood that a mobile computing device will detect a visual code within a captured image when a user of the device is attempting to do so. Such improvement can occur by guiding the user to move the mobile computing device, based on focal distance and/or prominent points distance. Such improvement can also occur by adjusting the exposure of the mobile computing device.

We claim:

1. A non-transitory computer-readable data storage medium storing program code executable by a mobile computing device to:

monitor a current focal distance of a camera of the mobile computing device as the camera captures an image and as the mobile computing device attempts to detect a visual code within the image;

compare the current focal distance to a focal distance range within which other mobile computing devices of a same model type as the mobile computing device captured images at a location of the mobile computing device and in which the visual code was successfully detected; and guide movement of the mobile computing device so that the current focal distance of the camera is within the focal distance range, until the visual code is successfully detected within the captured image.

2. The non-transitory computer-readable data storage medium of claim 1, wherein the program code is executable by the mobile computing device to further:

perform a concrete action responsive to successful detection of the visual code within the captured image after the mobile computing device has been moved in accordance to guidance thereof based on comparison of the current focal distance to the focal distance range.

3. The non-transitory computer-readable data storage medium of claim 1, wherein the program code is executable by the mobile computing device to further:

determine an in-focus measure of the camera from the image captured by the camera, wherein movement of the mobile computing device is guided just responsive to the determined in-focus measure being greater than an in-focus threshold.

4. The non-transitory computer-readable data storage medium of claim 1, wherein the other mobile computing devices of the same model type as the mobile computing device successfully captured images of more than one visual code at the location of the mobile computing device, the successfully captured images of each visual code having a corresponding focal distance sub-range, and wherein the program code is executable by the mobile computing device to further:

determine the focal distance range by overlapping the corresponding focal distance sub-range of the successfully captured images of each visual code.

5. The non-transitory computer-readable data storage medium of claim 4, wherein the program code is executable by the mobile computing device to further:
  determining a common focal distance range within the corresponding focal distance sub-range of the successfully captured images of each visual code,
  wherein the movement of the mobile computing device is guided further to minimize a difference between the current focal distance of the camera and the common focal distance.

6. The non-transitory computer-readable data storage medium of claim 1, wherein the program code is executable by the mobile computing device to further:
  calculate a distance between prominent points within the image captured by the camera of a mobile computing device as the camera captures the image and as the mobile computing device attempts to detect the visual code within the image; and
  compare the calculated distance to a prominent points distance range calculated from a distance between the prominent points within the images captured by the cameras of the other mobile computing devices of the same model type as the mobile computing device at the location of the mobile computing device and in which the visual code was successfully detected,
  wherein the movement of the mobile computing device is guided further so that the calculated distance is within the prominent points distance range, until the visual code is successfully detected within the captured image.

7. The non-transitory computer-readable data storage medium of claim 1, wherein the program code is executable by the mobile computing device to further:
  adjust an exposure of the camera of the mobile computing device, as the camera captures the image and as the mobile computing device attempts to detect the visual code within the image, so that the exposure is within a range of exposures at which the other mobile computing devices of the same model type as the mobile computing device captured the images at the location of the mobile computing device and in which the visual code was successfully detected.

8. A method comprising:
  calculating a distance between prominent points within an image captured by a camera of a mobile computing device as the camera captures the image and as the mobile computing device attempts to detect a visual code within the image;
  comparing the calculated distance to a prominent points distance range calculated from a distance between the prominent points within each of a plurality of images captured by cameras of other mobile computing devices of a same model type as the mobile computing device at a location of the mobile computing device and in which the visual code was successfully detected; and
  guiding movement of the mobile computing device so that the calculated distance is within the prominent points distance range, until the visual code is successfully detected within the captured image.

9. The method of claim 8, wherein the prominent points are identified within the image captured by the camera of the mobile computing device, before the prominent points are detected within the images captured by the cameras of the other mobile computing devices of the same model type as the mobile computing device at the location of the mobile computing device and in which the visual code was successfully detected determining the distance.

10. The method of claim 8, wherein the prominent points are detected within the image captured by the camera of the mobile computing device, after the prominent points are identified within the images captured by the cameras of the other mobile computing devices of the same model type as the mobile computing device at the location of the mobile computing device and in which the visual code was successfully detected determining the distance.

11. The method of claim 8, further comprising:
  monitoring a current focal distance of the camera of the mobile computing device as the camera captures the image and as the mobile computing device attempts to detect the visual code within the image; and
  comparing the current focal distance to a focal distance range within which the other mobile computing devices of the same model type as the mobile computing device captured the images at the location of the mobile computing device and in which the visual code was successfully detected,
  wherein the movement of the mobile computing device is guided further so that the current focal distance of the camera is within the focal distance range, until the visual code is successfully detected within the captured image.

12. The method of claim 11, further comprising:
  adjusting an exposure of the camera of the mobile computing device, as the camera captures the image and as the mobile computing device attempts to detect the visual code within the image, so that the exposure is within a range exposures at which the other mobile computing devices of the same model type as the mobile computing device captured the images at the location of the mobile computing device and in which the visual code was successfully detected.

13. A mobile computing device comprising:
  location hardware to determine a location of the mobile computing device;
  camera to capture an image at a focal distance;
  a non-transitory computer-readable data storage medium storing program code; and
  a processor to execute the program code to:
    calculate distance between prominent points within the image;
    compare the calculated distance to a prominent points distance range calculated from a distance between the prominent points within each of a plurality of images captured by cameras of other mobile computing devices of a same model type as the mobile computing device at the location of the mobile computing device and in which the visual code was successfully detected;
    compare the focal distance to a focal distance range within which the other mobile computing devices of the same model type as the mobile computing device captured the images at the location of the mobile computing device and in which the visual code was successfully detected; and
    guide movement of the mobile computing device, until the visual code is successfully detected within the image captured by the camera, so that one or more of: the calculated distance is within the prominent points distance range and the focal distance is within the focal distance range.

14. The mobile computing device of claim 13, wherein the processor is to execute the program code to guide the movement of the mobile computing device by:

determining that a first direction of movement in which the mobile computing device is to be guided so that the calculated distance is within the prominent points distance range is opposite a second direction of movement in which the mobile computing device is to be guided so that the focal distance is within the focal distance range; and responsively guiding movement of the mobile computing device in one of the first direction and the second direction based on comparing a smaller of: a focal distance variability value at which the other mobile computing devices of the same model type captured the images in which the visual code was successfully detected, and a prominent points distance variability value of the images captured by the other mobile computing devices of the same model type in which the visual code was successfully detected.

15. The mobile computing device of claim 13, wherein the processor is to execute the program code to further:

adjust an exposure of the camera of the mobile computing device so that the exposure is within a range of exposures at which the other mobile computing devices of the same model type captured the images at the location of the mobile computing device and in which the visual code was successfully detected.

* * * * *